(12) United States Patent
Simnioniw et al.

(10) Patent No.: US 8,523,984 B2
(45) Date of Patent: Sep. 3, 2013

(54) WATER CIRCULATION SYSTEMS WITH AIR STRIPPING ARRANGEMENTS FOR MUNICIPAL WATER TANKS, PONDS, AND OTHER POTABLE BODIES OF WATER

(75) Inventors: Corey M. Simnioniw, Belfield, ND (US); Jonathan L. Zent, Dickinson, ND (US); Douglas P. Walter, Dickinson, ND (US); Joel J. Bleth, Dickinson, ND (US); Willard R. Tormaschy, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 190 days.

(21) Appl. No.: 13/233,536

(22) Filed: Sep. 15, 2011

(65) Prior Publication Data

US 2012/0067799 A1 Mar. 22, 2012

Related U.S. Application Data

(60) Provisional application No. 61/384,285, filed on Sep. 19, 2010.

(51) Int. Cl.
*B01D 19/00* (2006.01)
*C02F 7/00* (2006.01)

(52) U.S. Cl.
USPC ............ 96/202; 210/170.05; 210/221.2; 210/242.2; 261/120; 261/121.1; 261/124

(58) Field of Classification Search
USPC ............ 210/747.5–747.9, 752, 758, 170.02, 210/205, 209, 242.1, 242.2, 170.05–170.11, 210/188, 220, 750; 261/91, 120, 124, 126, 261/DIG. 70, DIG. 7; 95/263, 265; 96/202
See application file for complete search history.

(56) References Cited

U.S. PATENT DOCUMENTS

| | | | | |
|---|---|---|---|---|
| 2,165,889 A * | 7/1939 | Fischer et al. | ................. | 261/93 |
| 4,229,302 A * | 10/1980 | Molvar | .................. | 210/220 |
| 4,797,063 A * | 1/1989 | Lott | ................. | 415/116 |
| 5,681,509 A * | 10/1997 | Bailey | ................. | 261/87 |
| 5,938,983 A * | 8/1999 | Sheaffer et al. | ........... | 261/122.1 |
| 7,285,208 B2 | 10/2007 | Tormaschy | | |
| 7,329,351 B2 * | 2/2008 | Roberts et al. | .............. | 210/620 |
| 7,332,074 B2 | 2/2008 | Tormaschy | | |
| 7,517,460 B2 | 4/2009 | Tormaschy | | |
| 7,644,909 B2 * | 1/2010 | Huhta-Koivisto et al. | ...... | 261/91 |
| 7,789,553 B2 | 9/2010 | Tormaschy | | |
| 2005/0155922 A1* | 7/2005 | Tormaschy et al. | ......... | 210/241 |

* cited by examiner

*Primary Examiner* — Duane Smith
*Assistant Examiner* — Cabrena Hall
(74) *Attorney, Agent, or Firm* — W. Scott Carson

(57) ABSTRACT

Water circulation systems with air stripping arrangements to treat and remove undesirable disinfectant byproducts from potable water in municipal water tanks, ponds, and other bodies of water. The systems include a flotation platform, dish, draft tube, and an impeller to draw water from the depths of the tank up through the draft tube to be discharged outwardly of the dish to create a primary circulation pattern and an induced, inner or secondary circulation pattern. Each system additionally includes an air stripping arrangement positioned adjacent and about the upper portion of the draft tube and adjacent an upper portion of the secondary flow. The air stripping arrangement includes a plurality of submerged sets of air manifolds wherein pressurized air is supplied to the air manifolds and driven out of them in bubbles to create a treatment zone immediately above each set of manifolds.

31 Claims, 18 Drawing Sheets

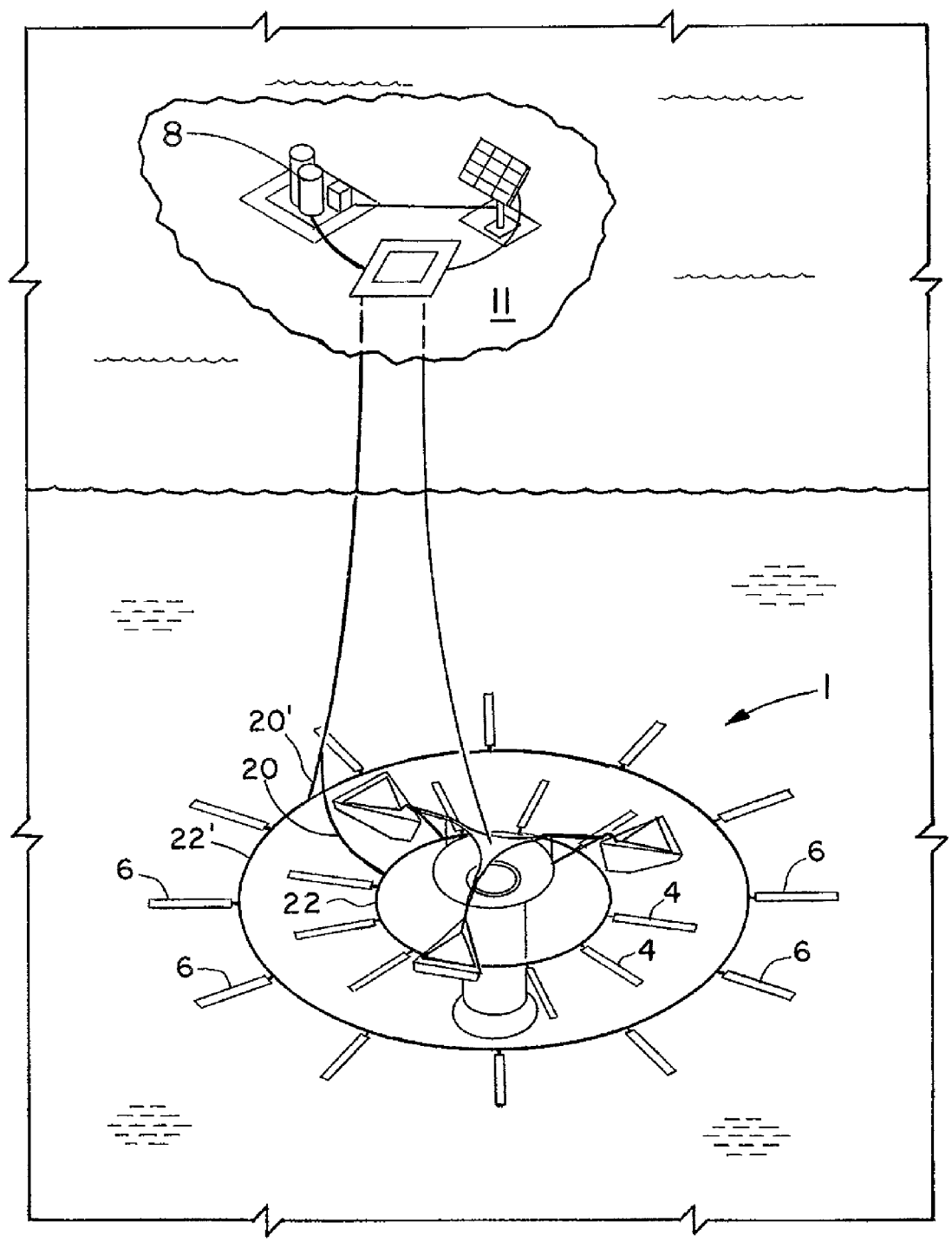

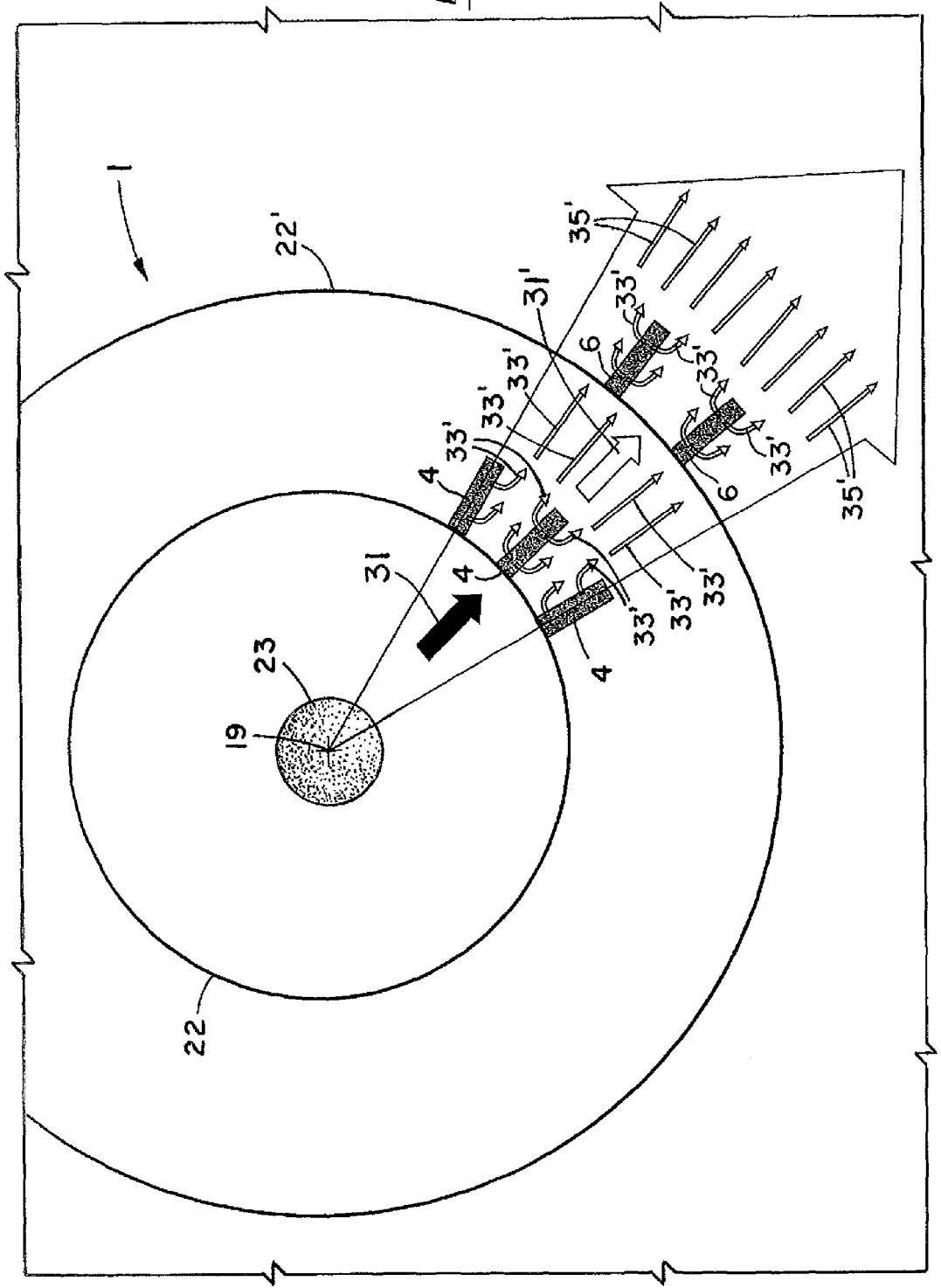

Fig. 8

THM Liquid State (aq)
THM Gaseous State (gas)
AIR + ⊘ = ⊘
Air Contacting THM (aq) results in THM (gas) within air Non-Treated Water Zone Treated Water Zone 27
10
16'
16'

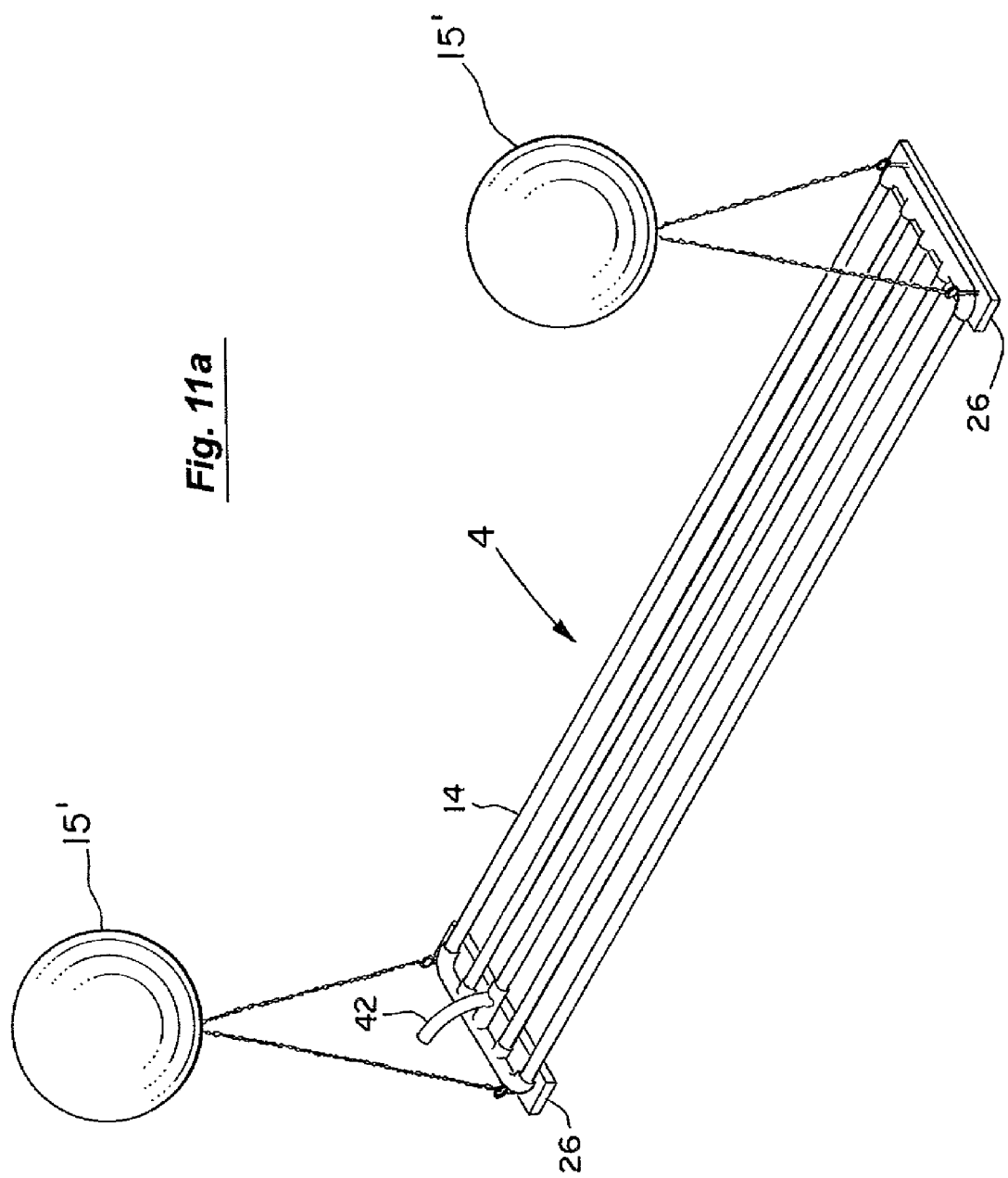

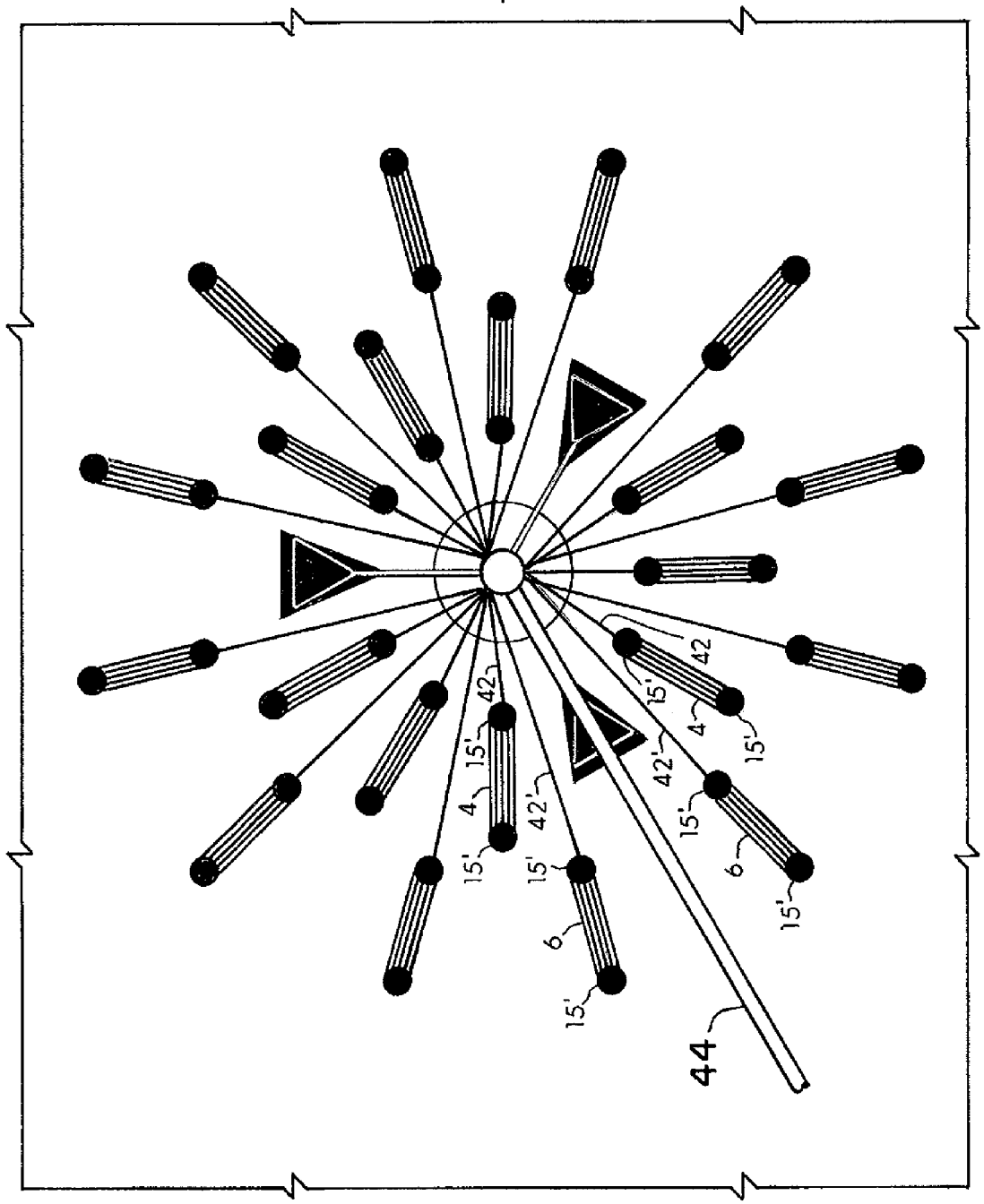

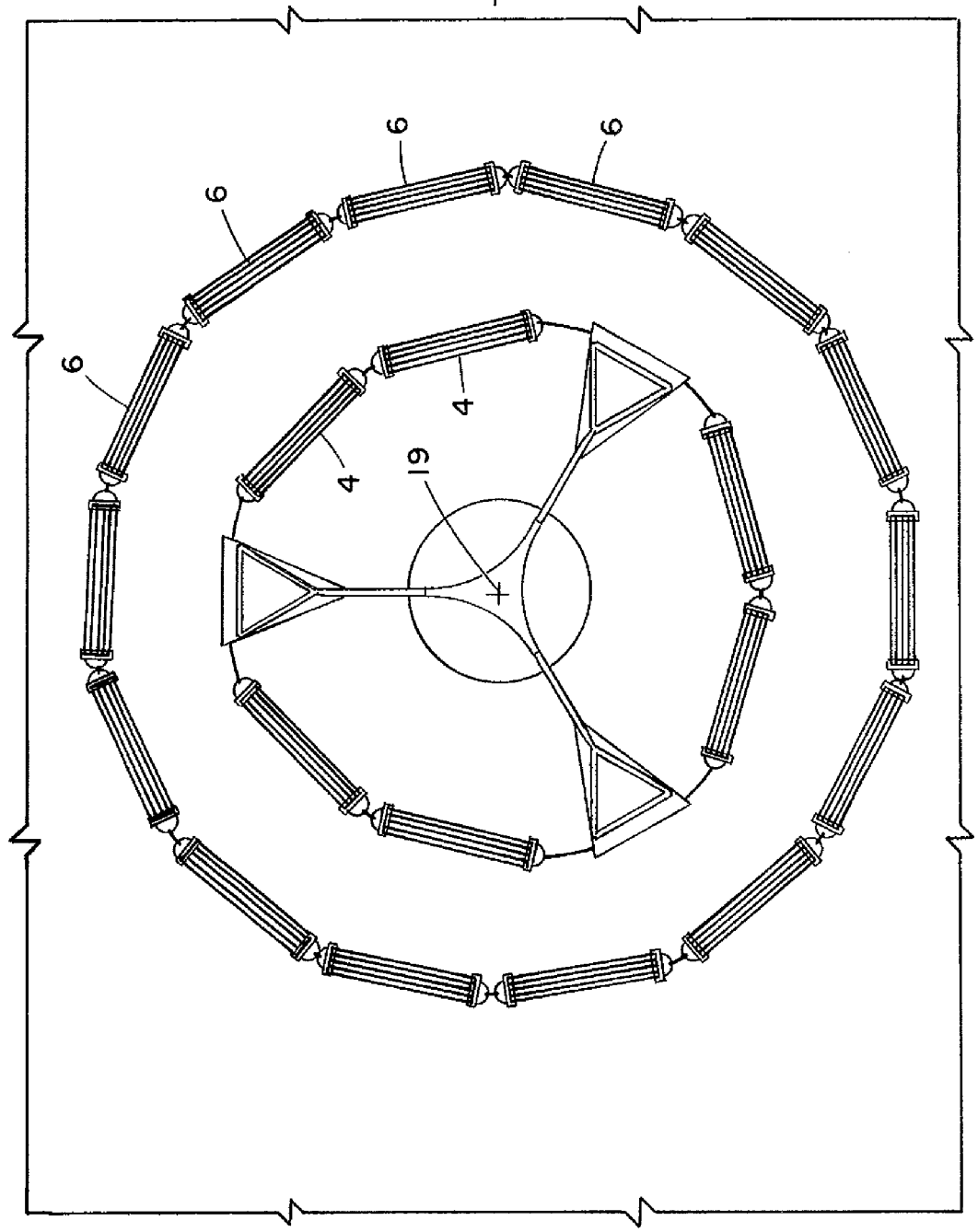

WATER CIRCULATION SYSTEMS WITH AIR STRIPPING ARRANGEMENTS FOR MUNICIPAL WATER TANKS, PONDS, AND OTHER POTABLE BODIES OF WATER

RELATED APPLICATIONS

This application claims the benefit of U.S. Provisional Patent Application Ser. No. 61/384,285 filed Sep. 19, 2010, which is incorporated herein by reference.

BACKGROUND OF THE INVENTION

1. Field of the Invention

This invention relates to the field of water circulation systems for municipal water tanks, ponds, and other potable bodies of water and more particularly to the field of such systems that further treat undesirable disinfectant byproducts in the bodies of water.

2. Discussion of the Background

Potable bodies of water and in particular municipal and other water sources intended for drinking are initially treated with disinfectants such as chlorine and chloramines. These disinfectants very efficiently and effectively eliminate harmful agents in the water making the water potable and suitable for drinking. Such disinfectants, however, create undesirable disinfectant byproducts such as chloroform, bromodichloromethane, dibromochloromethane, and bromoform which are all forms of trihalomethanes (THM's). In very small amounts (e.g., very low parts per billion), these THM's are not believed to be a serious threat to health but reduction of them in potable water reservoirs such as municipal water tanks is always desirable.

With this and other problems in mind, the present invention was developed. In it, water circulation systems are provided to thoroughly and relatively quickly mix and blend the water in a potable water reservoir such as a municipal water tank, pond, or other body of water and to provide air stripping arrangements to treat any undesirable disinfectant byproducts in the water.

SUMMARY OF THE INVENTION

This invention involves water circulation systems with air stripping arrangements to treat and remove undesirable disinfectant byproducts from potable water in municipal water tanks, ponds, and other bodies of water. The systems include a flotation platform, dish, draft tube extending downwardly into the depths of the tank or other body of water, and an impeller to draw water from the depths of the tank up through the draft tube to be discharged outwardly of the dish. The systems create a primary circulation pattern including an upper flow moving outwardly of the dish adjacent the surface of the body of water. The upper flow continues outwardly to the sides of the tank and travels downwardly along the walls of the tank to the tank bottom to be again drawn into and up through the draft tube. The primary circulation pattern in turn induces an inner or secondary circulation pattern passing up adjacent the outside of the draft tube toward the water surface and outwardly immediately beneath the upper flow of the primary circulation pattern to pass outwardly and downwardly within the primary one and again up adjacent the draft tube.

Each system additionally includes an air stripping arrangement positioned adjacent and about the upper portion of the draft tube and adjacent an upper portion of the secondary flow. The air stripping arrangement includes a plurality of submerged sets of air manifolds extending outwardly of and spaced about the central axis of the system and the upper portion of the draft tube. In operation, pressurized air is supplied to the air manifolds and driven out of them to create a treatment zone immediately above each set of manifolds. In this regard, each set of manifolds has a plurality of tubes with series of small, discharge holes in them to create very small air bubbles. As the air bubbles rise through the treatment zone, they contact and treat the water in the upper flow of the primary circulation pattern discharging outwardly of the dish and passing through the zone. Additionally, the action of the air bubbles from the air manifolds will further induce the inner, secondary circulation pattern to rise up into the treatment zone and also be treated to strip out undesirable disinfectant byproducts such as trihalomethanes (THM's). In this manner, the rising air bubbles from the air manifolds not only contact and treat the upper flow of the primary circulation pattern moving outwardly of the dish adjacent the water surface but also further induce the secondary circulation pattern to rise into the treatment zone and be treated.

Additionally, the water in both the primary circulation pattern and the induced secondary circulation pattern that does not initially pass through a treatment zone above the air manifolds is nevertheless mixed or blended with water that did pass through a treatment zone. Consequently, the contents of undesirable disinfectant byproducts in this mixed or blended water is diluted to a certain degree as it moves outwardly of the central axis of the system. In this manner and over time (e.g., several hours), virtually all of the water in the tank or other body of water will be treated/diluted to eventually reduce the undesirable disinfectant byproducts to an acceptable level.

BRIEF DESCRIPTION OF THE DRAWINGS

FIG. 1a is taken generally along line 1a-1a of FIG. 3 with the rear float additionally shown.

FIG. 3 is a top plan view taken along line 3-3 of FIG. 1a.

FIG. 5 is a perspective view of the circulation system in use in a municipal water tank.

FIG. 6b is an enlarged view of one end of the set of air manifolds of FIG. 6a.

FIG. 7b is a plan view of the circulation patterns set up in the tank and the manner in which portions of the primary and secondary flow patterns are initially treated in the zones above each set of air manifolds and mixed or blended with other portions of the flow patterns.

FIG. 8 is a simplified showing of the operation of the air stripping taking place in a treated zone of the present invention versus an adjacent, non-treated zone.

FIGS. 11a-11b show a modified set of air manifolds that is supported by floats separately and substantially independently of the main flotation platform.

FIG. 12 schematically illustrates an air supply arrangement to provide pressurized air to the air manifolds of FIGS. 11a-11b.

FIG. 13 illustrates a second array of the sets of air manifolds in which the sets are arranged in inner and outer, concentric groups about the central axis of the system.

DETAILED DESCRIPTION OF THE INVENTION

Figure 1A:
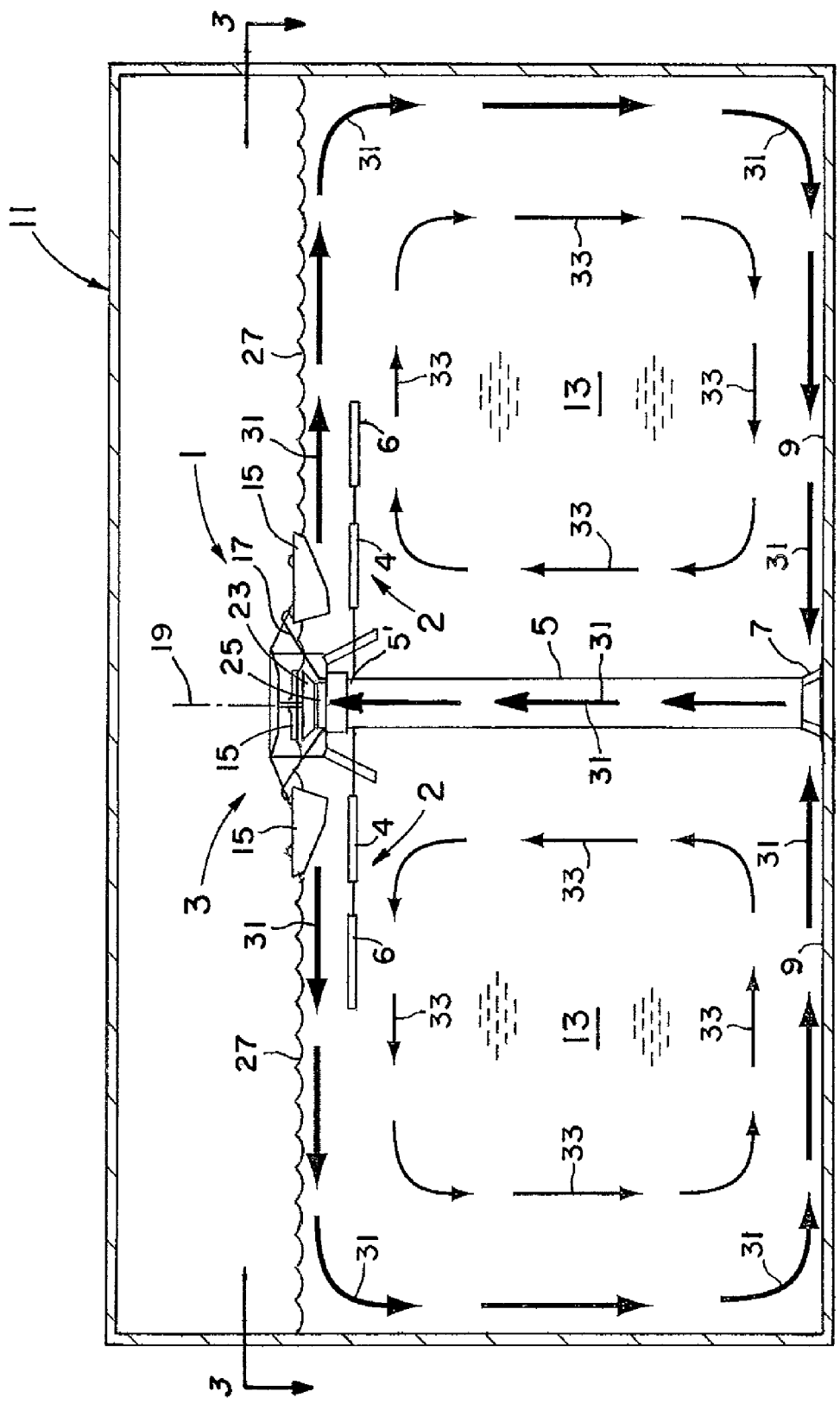
FIG. 1a is a cross-sectional view of the primary and inner or secondary circulation patterns set up in the tank or other body of potable water by the circulation system.
Figure 1B:
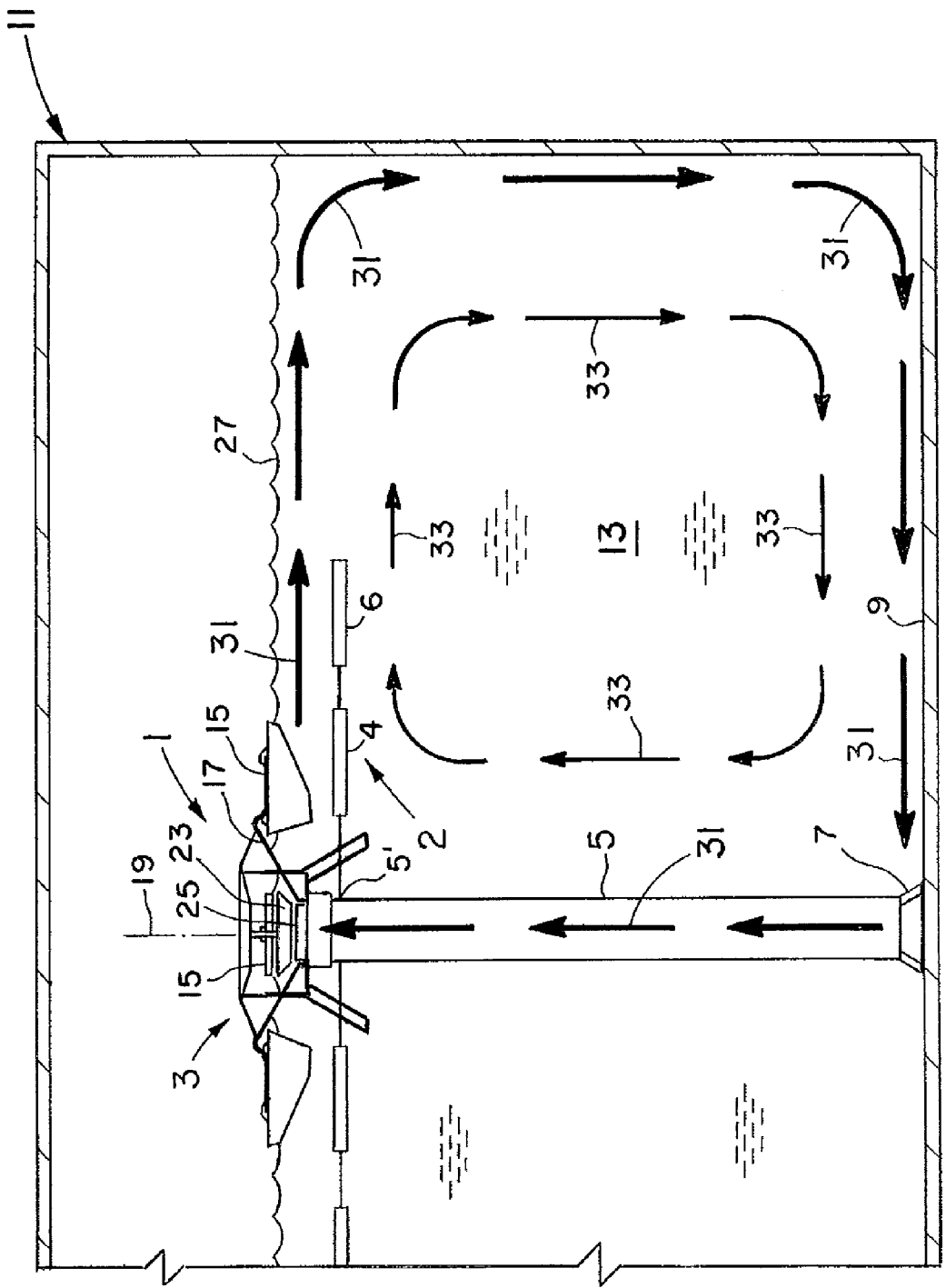
FIG. 1b is an enlarged view of the right side of FIG. 1a further showing these water circulation patterns.
Figure 2:
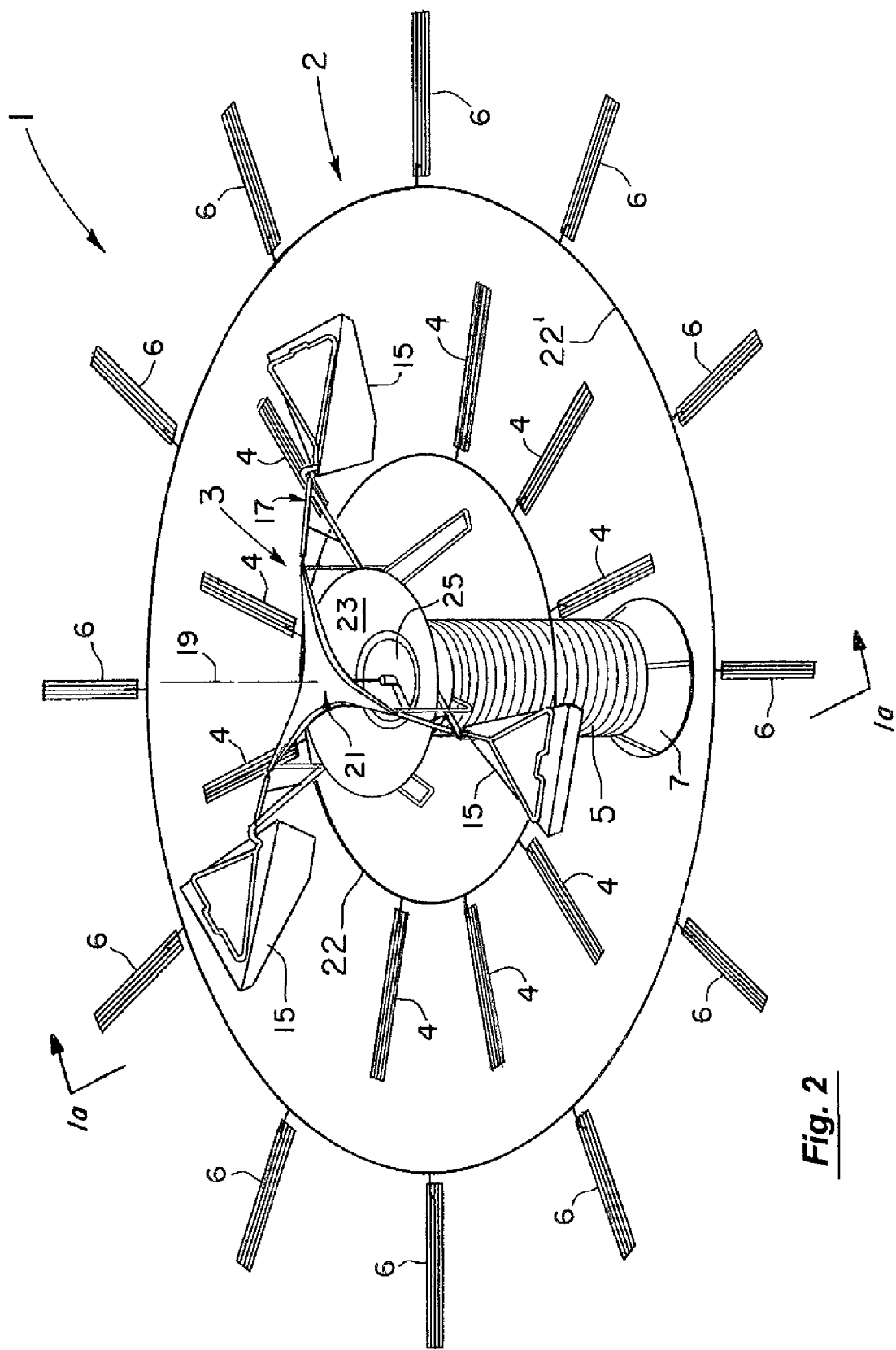
FIG. 2 is a perspective view of the water circulation system of the present invention.
Figure 3:
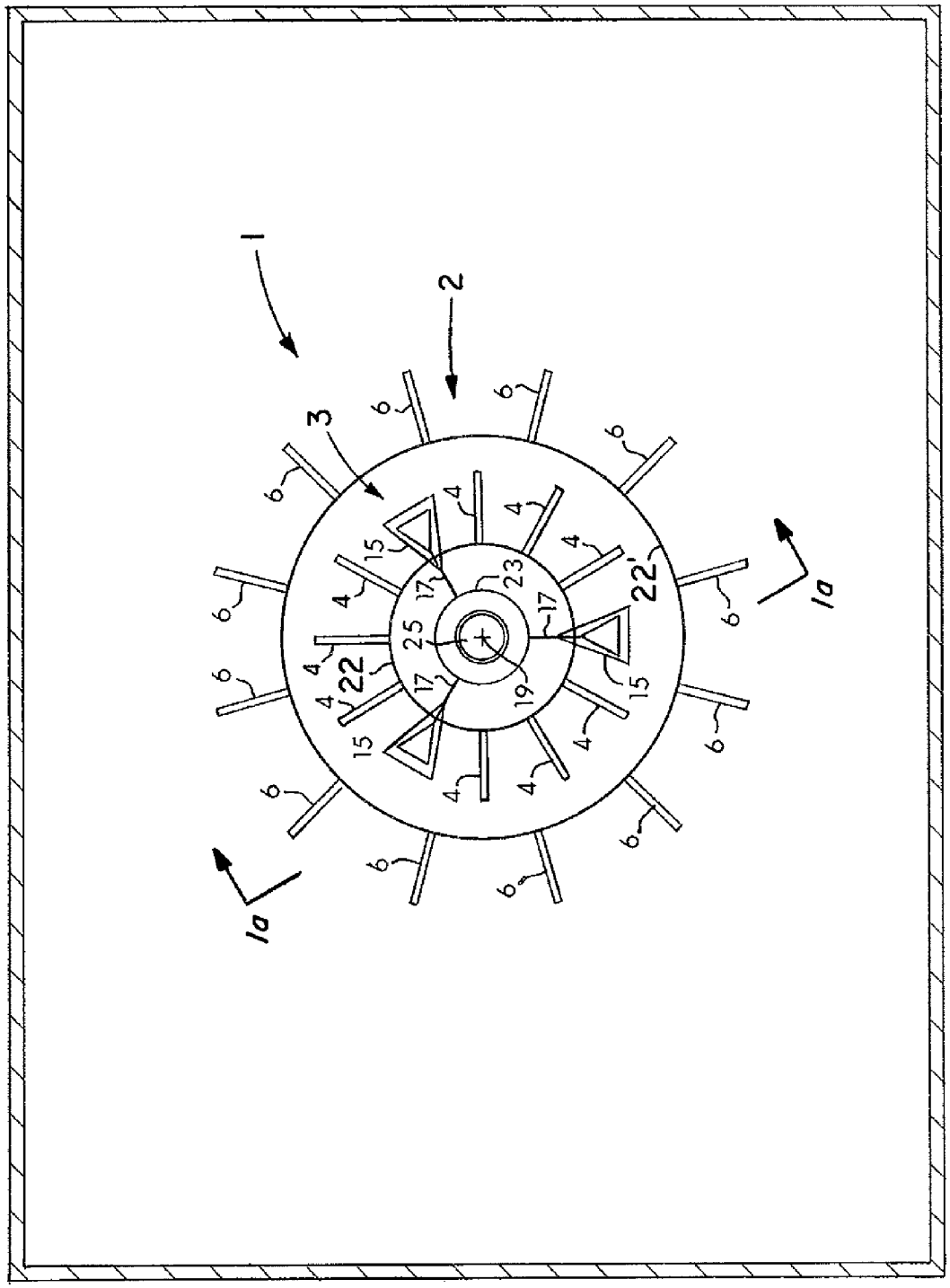

As schematically shown in FIGS. 1a and 1b, the water circulation system 1 of the present invention includes an upper flotation platform 3 with a draft tube 5 depending downwardly therefrom to the water inlet 7 of the draft tube 5. The inlet 7 is preferably positioned and supported slightly above the floor 9 of the municipal water tank 11 or other body of water 13. The flotation platform 3 as best seen in FIGS. 2 and 3 includes three floats 15 supported on the tubular frame 17 of the platform 3. The floats 15 extending outwardly of the central, vertical axis 19 are preferably evenly spaced about the axis 19 (see FIG. 3). The floats 15 extend far enough from the central axis 19 to provide stable and buoyant support structure for the system 1 including its enclosed electric drive motor 21 (see again FIG. 2), discharge dish 23, impeller 25, and draft tube 5. The overall buoyancy of the system 1 and in particular the platform 3 is preferably designed to support the upper edge or lip of the dish 23 about 3 inches or so below the surface 27 of the body of water 13 (FIGS. 1a and 1b). However, the dish 23 could be supported with its lip above the water surface 27 if desired.

In operation as best seen in FIGS. 1a and 1b, the impeller 25 (see also FIG. 2) is rotated by the motor 21 about the central, substantially vertical axis 19 (FIG. 1a) to draw water into the bottom inlet 7 of the draft tube 5. The water is then uplifted through the draft tube 5 toward the dish 23 and discharged outwardly of the dish 23 to establish a primary circulation path or pattern 31 in FIG. 1a in the body of water 13. This primary circulation pattern 31 in turn induces a secondary or inner circulation path or pattern at 33 within the primary pattern 31. FIG. 1b is an enlarged view of these patterns 31 and 33 on the right side of FIG. 1a. These nearly laminar, circulation patterns 31 and 33 of FIGS. 1a and 1b preferably extend 360 degrees about the axis 19 to thoroughly and completely mix and circulate the water in the body of water 13 whether the water is in a tank such as 11 or an open air environment such as a pond or lake.

The circulation system 1 of the present invention additionally includes an air stripping arrangement 2 (FIGS. 1a and 1b) to treat at least portions of the circulating water in the primary flow 31 and at least portions of the induced secondary flow 33. More specifically, the system 1 of the present invention has an array of radially extending manifolds at 4,6 positioned in inner and outer groups as best seen in FIGS. 2 and 3. The radially extending manifolds at 4 of the inner group are preferably spaced at least 30 degrees and more preferably at least about 60 degrees from each other about the central axis 19 (see FIG. 3). Similarly, the radially extending manifolds at 6 of the outer group are so spaced from each other about the axis 19. The respective air manifolds at 4,6 in turn of the inner and outer groups are also preferably staggered or radially spaced from each other about 30 degrees about the axis 19 as perhaps best seen in FIG. 3. The air manifolds at 4 of the inner group in this regard extend as shown in FIG. 3 a first distance (e.g., 5 feet) outwardly relative to the central axis 19. The air manifolds at 6 of the outer group then extend (e.g., 5 feet) from adjacent the first distance to a second distance farther from the central axis 19. The circular supply manifolds 22, 22' can be respectively spaced for example 10 and 20 feet from the central axis 19. The air manifolds at 4, 6 are preferably submerged (e.g., 6 inches to 3 feet or slightly more) below the surface 27 of the body of water 13 (FIGS. 1a and 1b) substantially adjacent and spaced about the upper portion 5' of the draft tube 5. The upper portion 5' in this regard as shown extends substantially along and about the vertical axis 19.

In operation and as explained in more detail below, air under relatively low pressure (e.g., 1-2 psi) is delivered to and driven out of the air manifolds at 4,6 (FIGS. 4a and 4b) to create treatment zones at the submerged locations 10 just above each of the manifolds at 4,6. That is, pressurized air as discussed below is bubbled out of the air manifolds at 4,6 and creates treatment zones 10 in FIGS. 4a and 4b where the air bubbles will contact the water in the treatment zones 10 and strip out undesirable disinfectant byproducts such as trihalomethanes (THM's). More specifically, each treatment zone at the submerged location 10 is positioned so that at least a portion of the uplifted, untreated water 31 from the draft tube 5 discharging outwardly from the dish 23 in FIGS. 4a and 4b will pass through the treatment zone 10. In doing so, this untreated water 31 of the primary circulation pattern with an undesirable amount of disinfectant byproducts will contact the air bubbles in the treatment zones 10 and be treated. This is schematically shown by open arrows 31' in FIGS. 4a and 4b versus the closed arrows 31 representing untreated water. It is noted that it is important to have a system such as 1 that will circulate and bring up water from the lowest depths of the tank as many undesirable disinfectant byproducts including chloroform have a higher density than water and therefore a greater tendency to concentrate at the lower depths of the tank or other body of water.

Figure 4A:
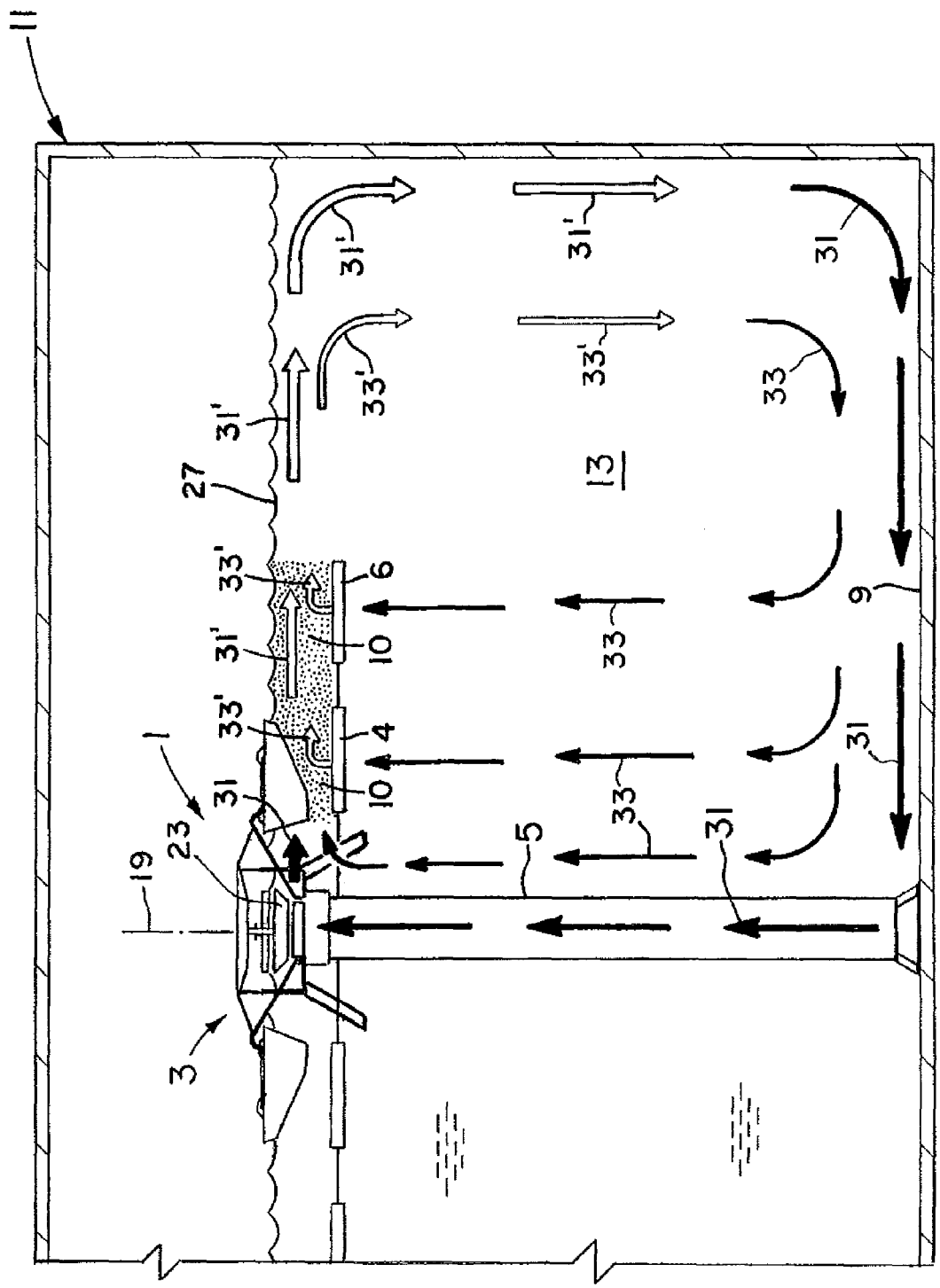
FIG. 4a is a view similar to FIG. 1a but with the air stripping arrangement of the present invention turned on and in use.
Figure 4B:
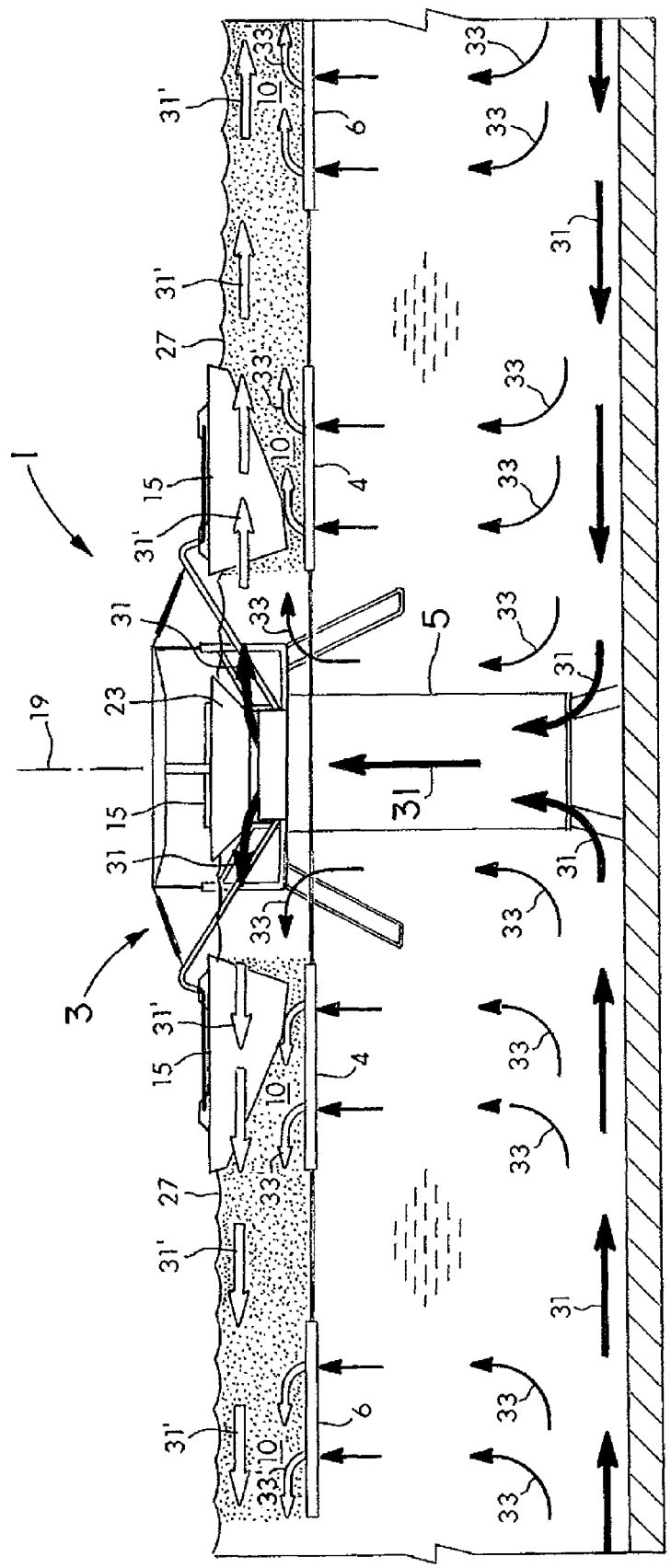
FIG. 4b is an enlarged view of the right side of FIG. 4a further showing the operation of the water circulation system with the air stripping arrangement turned on and in use.

Additionally, the action of the air bubbles from the air manifolds at 4,6 will further induce the inner, secondary circulation pattern 33 in FIGS. 4a and 4b to rise up into the treatment zones 10 and also be treated as schematically shown by open arrows 33'. Stated another way, the rising air bubbles from the air manifolds at 4,6 will not only contact and treat the upper flow of the primary circulation pattern at 31,31' moving outwardly of the dish 23 adjacent the water surface 27 but also further induce the secondary circulation pattern at 33 to rise into the treatment zone 10 and be treated at 33'.

Figure 6A:
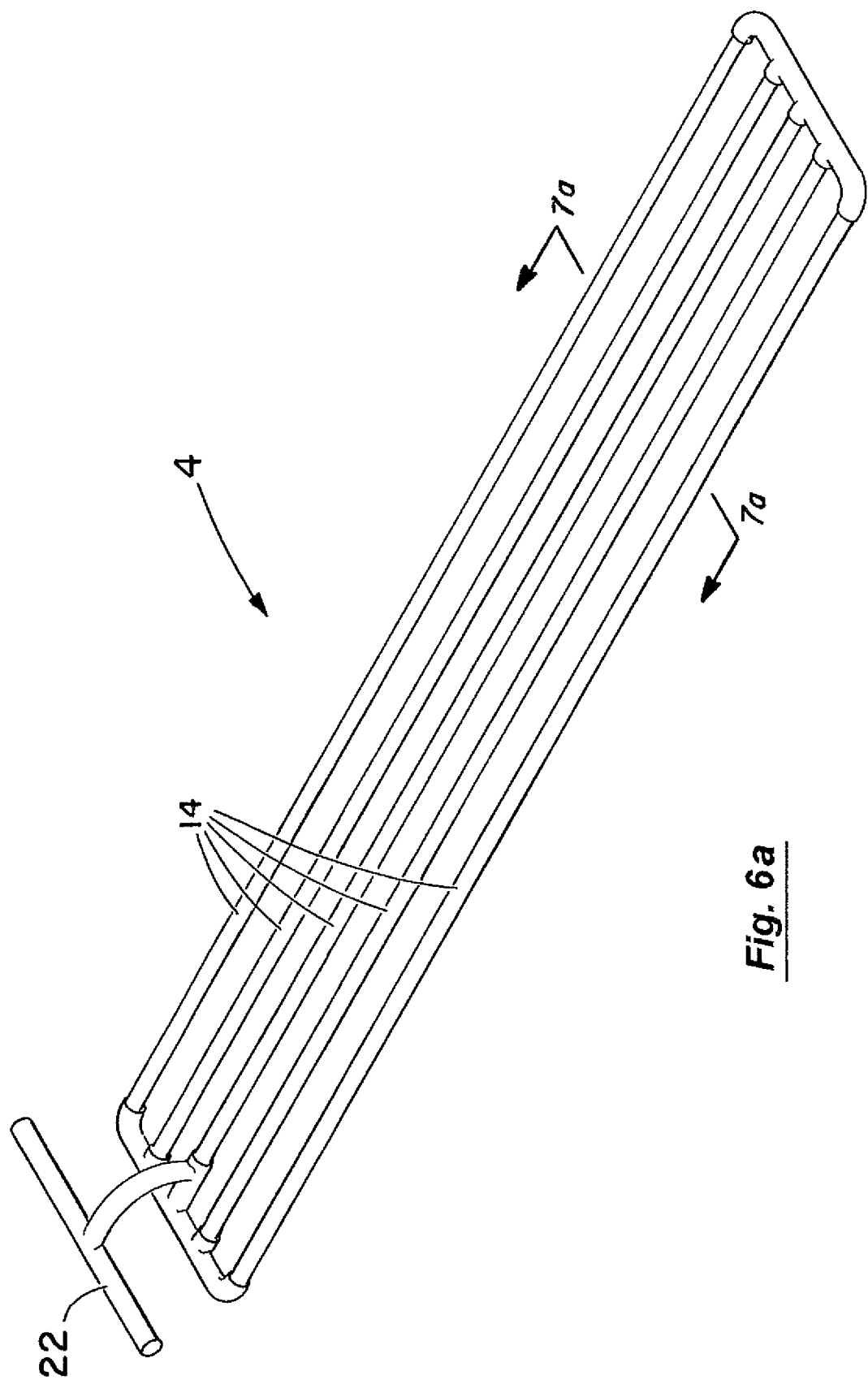
FIG. 6a is a view of one set of air manifolds of the air stripping arrangement.
Figure 6B:
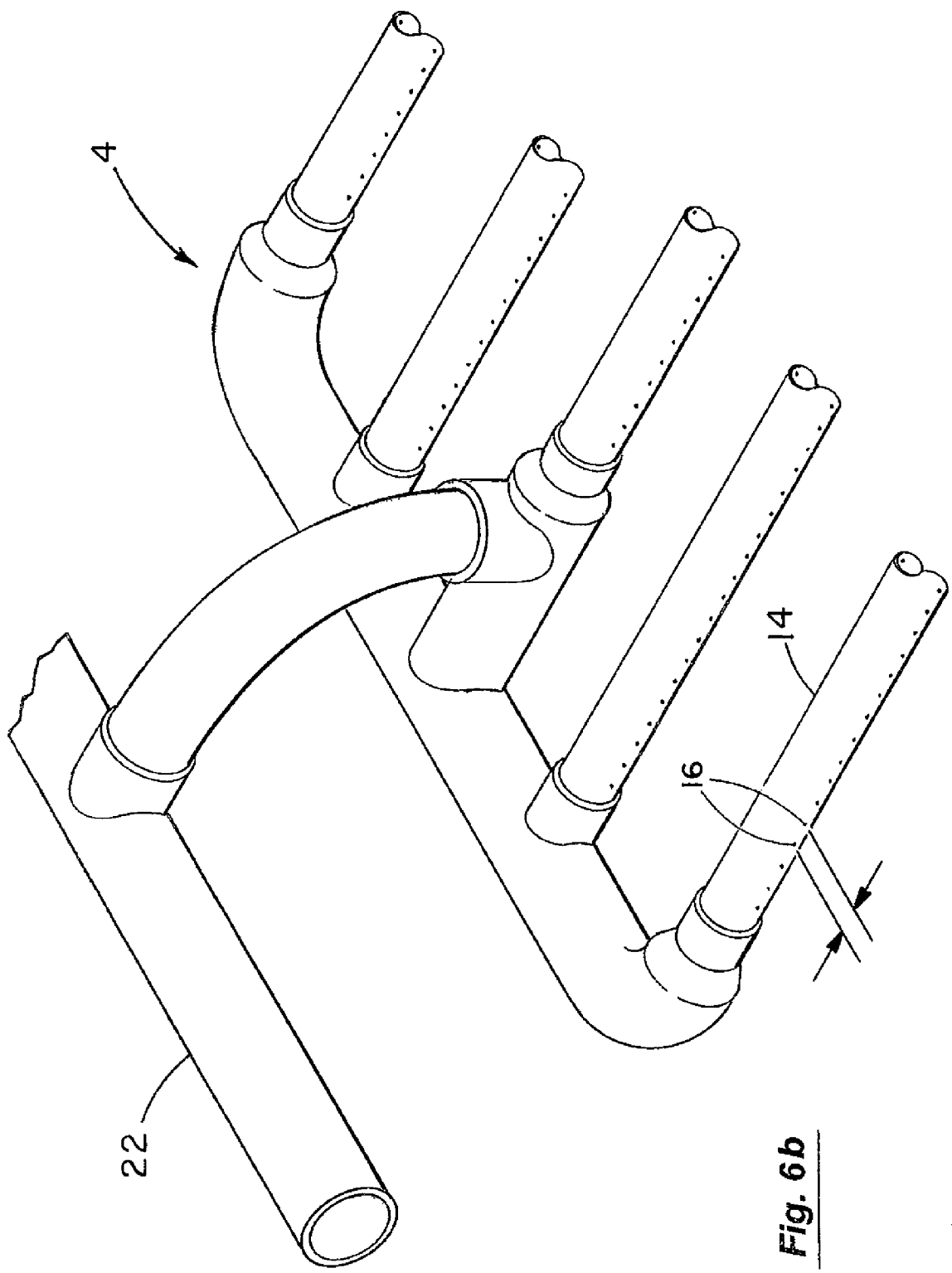

To accomplish this in the environment of the tank 11 of FIG. 5, a blower 8 or other source of pressurized air (e.g., 1-2 psi) can be in fluid communication and operated to deliver the pressurized air via lines 20,20' to the inner and outer, circular supply manifolds 22, 22'. The inner and outer, supply manifolds 22, 22' in turn are in fluid communication and deliver the pressurized air to the sets of air manifolds such as 4 in FIGS. 5, 6a, and 6b. Each set of air manifolds at 4,6 can be just a single linear tube 14 but is preferably at least two or more linear tubes 14 spaced from each other (e.g., 1-2 inches) as in FIG. 6a with the tubes 14 radially spaced 1-2 degrees from each other about the central axis 19. Each linear tube 14 in turn has an outer diameter of about 1-2 inches and also has a series of small, discharge holes 16 (FIG. 6b) extending axially therealong. The holes 16 are preferably as small as possible (e.g., 0.02 inches or less in diameter to minimize the size of the air bubbles and maximize the total surface area of them). The holes 16 can be spaced for example about 0.25 inches from each other and the wall thickness of the tubes 14 can be on the order of 0.02 to 0.125 inches. Each set of manifolds such as 4 in FIG. 6*a* can have a footprint for example of about 1×5 feet.

Figure 7A:
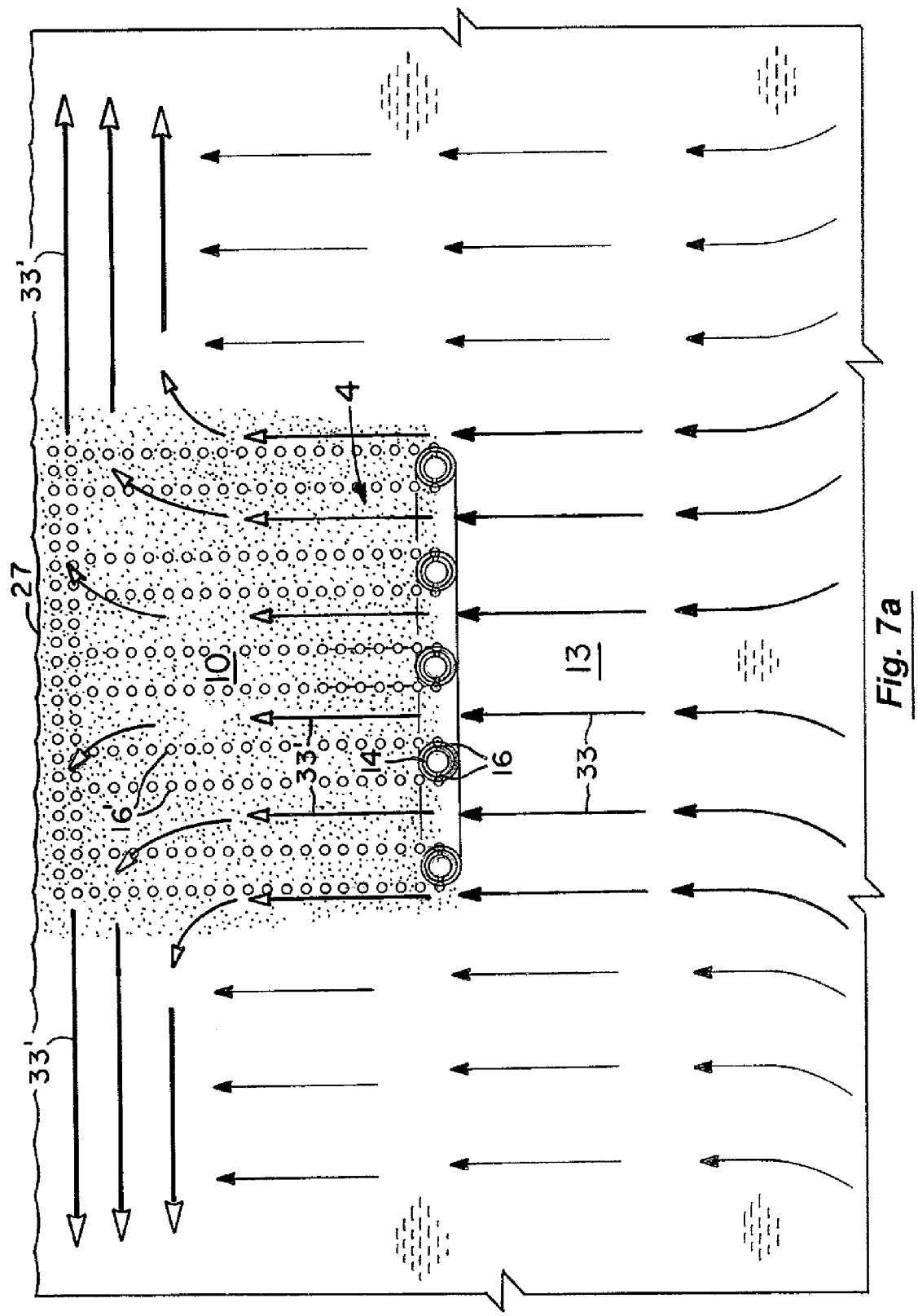
FIG. 7a is a view taken along line 7a-7a of FIG. 6a of the treatment zone that is created by the air bubbles emitted for each set of manifolds.

In operation as shown in FIG. 7*a* (which is taken along line 7*a*-7*a* of FIG. 6*a*), air bubbles 16' pass out of the diametrically opposed series of discharge holes 16 in each linear tube 14 and immediately rise toward the surface 27 of the body of water 13 to create a treatment zone 10. The discharge holes 16 of adjacent tubes 14 preferably face one another with the discharge holes 16 of the outer tubes 14 discharging outwardly. The air bubbles 16' induce the secondary circulation pattern 33 to rise through and around the tubes 14 to be treated as schematically shown by the open arrowheads of 33'. The water to air ratio in the zone 10 could be for example on the order of 10 parts water to 1 part air for efficient treatment. The rising air bubbles 16' also contact and treat the upper flow 31 of the primary circulation pattern discharging outwardly from the dish 23 and passing through each treatment zone formed above the air manifolds 4,6 as illustrated in the plan view of FIG. 7*b*. That is, each set of air manifolds such as 4 in FIG. 7*a* aides in establishing a flow as shown in the induced or secondary flow pattern 33,33' to treat this water in the zone 10 above the manifold 4 in FIG. 7*a*. Additionally, the upper or surface flow at 31 (see the plan view of FIG. 7*b*) in the primary circulation pattern discharges from the dish 23 and passes outwardly through a treatment zone formed above the air manifolds 4,6 (such as the treatment zone 10 as established above the air manifold 4 in FIG. 7*a*). This outwardly flowing surface flow 31 is then treated as schematically shown in FIG. 7*b* by the open arrow 31'. In the orientation of FIG. 7*a*, this upper or surface flow of 31,31' in FIG. 7*b* would be coming out of the page of FIG. 7*a* adjacent the water surface 27 in FIG. 7*a*.

It is further noted that the water in both the primary circulation pattern 31 and the induced secondary circulation pattern 33 that does not initially pass through a treatment zone 10 above the air manifolds at 4,6 of FIG. 7*b* is nevertheless mixed or blended with water that did pass through a treatment zone 10. Consequently, the contents of undesirable disinfectant byproducts in this mixed or blended water is diluted to a certain degree as it moves outwardly as schematically illustrated in FIG. 7*b* by the outer, open arrows 35'. In this manner and over time (e.g., several hours), virtually all of the water in the tank 11 or other body of water will be treated/diluted to eventually reduce the undesirable disinfectant byproducts to an acceptable level.

Stated another way, the water circulation system 1 with the air stripping arrangement 2 of the present invention establishes primary and secondary flow patterns 31,31' and 33,33' (FIGS. 4*a* and 4*b*) that over time will bring virtually all of the water in the tank 11 or other body of water into a series of relatively small, localized treatment zones 10. This is in contrast for example to bubbling up air from air manifolds adjacent and essentially covering the entire floor 9 of the tank 11 and attempting to try to treat all of the water in the tank at once. In addition to other drawbacks, such large introductions of air can create operating and cost problems in the system as discussed below.

The sets of air manifolds at 4,6 are relatively shallow (e.g., 0.5 to 3 feet or slightly more) so relatively low, pressurized air can be used (e.g., 1-2 psi) versus, for example, air manifolds at a depth of 20-30 or more feet or adjacent the floor 9 of the tank 11. This not only reduces the energy costs to produce the pressurized air but also increases the efficiency of the treatment of the water as bubbled air essentially does all the treating it is going to do and becomes saturated with the disinfectant byproducts in a relatively small vertical distance (e.g., 2-3 feet). Bubbling air from deeper depths is then not only more expensive but after rising 3 feet or so, it does little more effective treating and can leave the higher water essentially untreated. In contrast, the sets of air manifolds at 4,6 of the present invention rise and fall with the flotation platform 3 to remain at the desirable, relatively shallow depth (e.g., 2-3 feet) regardless of the level of the water in the tank 11. To accommodate this, the draft tube 5 is preferably a collapsible one (e.g., with walls that are bellows or telescoping). By such fluctuating of the air manifolds at 4,6 with the water level, the pressurized air supplied by the blower 8 of FIG. 5 can then be essentially constant versus needing to greatly fluctuate depending on the water depth of the tank in systems with the air manifolds positioned deeper in the tank (e.g., adjacent the floor of the tank). The relatively shallow placement of the air manifolds also results in less air entrainment in the circulating water. Water in this regard having a high entrainment of air can cause problems in circulation systems. That is, air is more compressible than water and excessive air entrainment can lead to cavitations, water hammer, and other phenomena that can damage the operating parts of the system and adversely affect the desired circulation patterns.

FIG. 8 is a simplified showing of the operation of the air stripping taking place in a treated zone 10 of the present invention on the left side of FIG. 8 versus the adjacent, non-treated zone on the right side of FIG. 8. In the treated zone 10, air bubbles 16' from the linear tubes 14 of a set of air manifolds such as 4 in FIG. 7*a* rise to contact the undesirable disinfectant byproducts (e.g., THM's) which are in a liquid or aqueous state in the water. Upon contact, the TMH's of FIG. 8 in a liquid or aqueous state are volatilized to a gaseous state and taken in by the nitrogen (e.g., 78%) and oxygen (e.g., 21%) inside each air bubble 16'. The air bubble 16' and gaseous THM's inside it then rise to the water surface 27 and escape into the atmosphere above the water surface 27. The nitrogen in the air bubble 16' serves as the main mode of holding the THM's as both THM's and air escape together from the water following exposure to the atmosphere. Oxygen in the air bubble 16' also holds THM's but has a much higher likelihood of becoming soluble in the water. Nitrogen is insoluble in water and will not dissolve back into it like oxygen has a tendency to do. Consequently, as the air bubbles 16' are exposed to THM's in the water, the majority of the THM's are transported out of the water without re-entering by the nitrogen in the air.

Figure 9A:
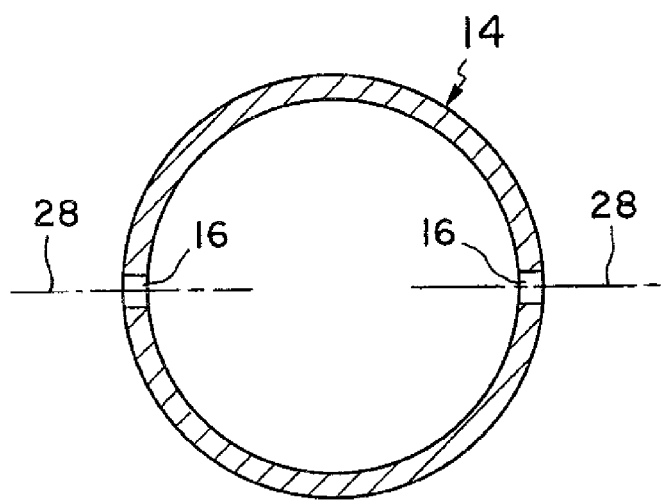
FIGS. 9a-9d show various cross-sectional shapes that can be used for the linear tubes in each set of air manifolds.
Figure 9B:
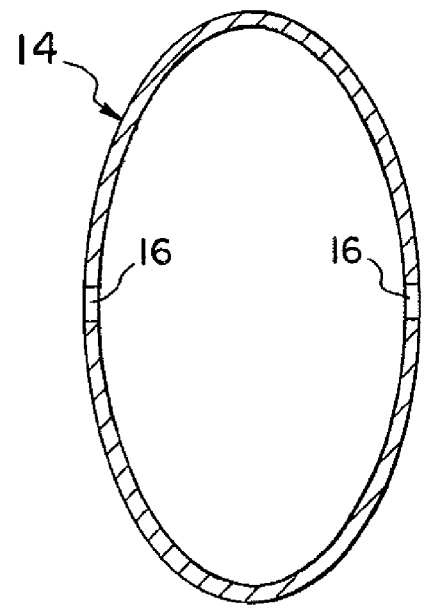
Figure 9C:
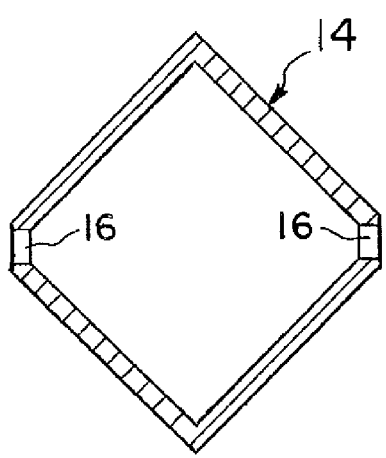
Figure 9D:
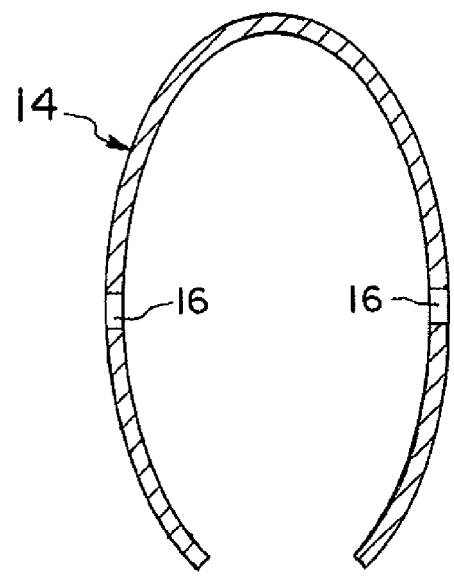
Figure 10A:
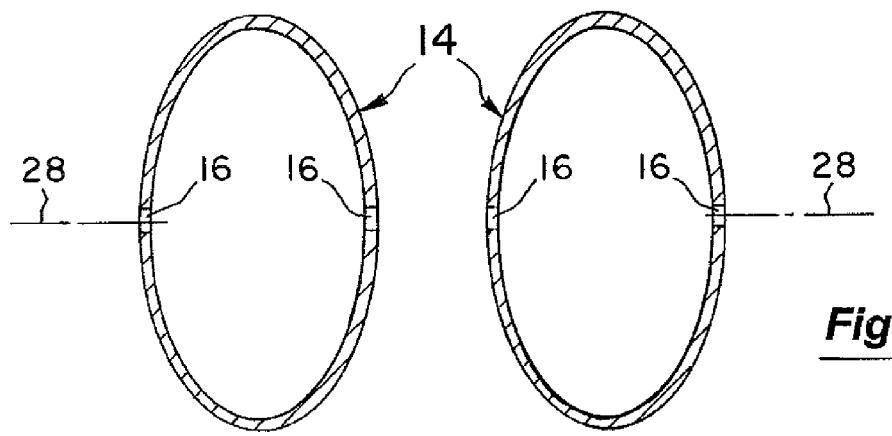
FIGS. 10a-10c show pairs of the linear tubes side-by-side with the series of air discharge holes at different, vertical locations in the tubes.
Figure 10B:
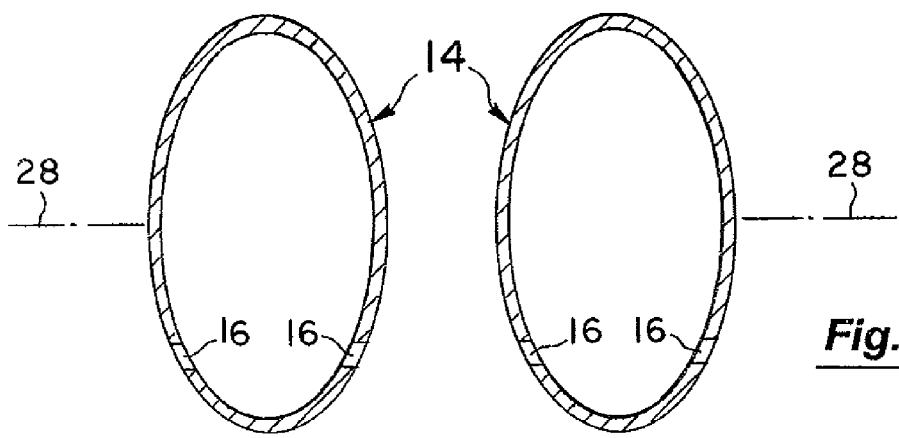
Figure 10C:
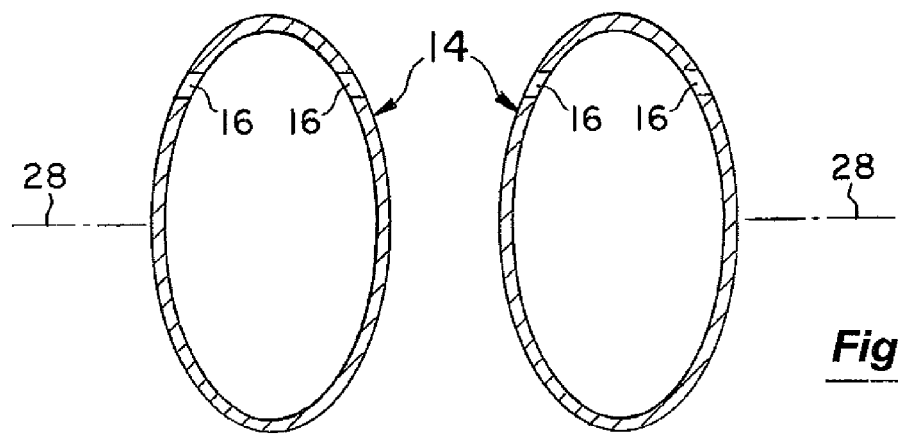

The cross-sectional shapes of the linear tubes 14 in the air manifold sets at 4,6 have been shown as being circular as in FIG. 9*a* with the series of discharge holes 16 being diametrically opposed to each other essentially at the center line 28. However, the cross-sectional shape could be other ones such as the elliptical shape of FIG. 9*b* (with a larger height to width ratio) or the diamond shape of FIG. 9*c*. The shape could also be an open one as in FIG. 9*d* in which the elliptical shape of FIG. 9*b* is truncated to form an inverted U-shape with the opening in the U-shape facing downwardly. In use, each set of air manifolds at 4,6 could be a single linear tube 14 but preferably there are at least two tubes 14 as in FIGS. 10*a*-10*c* to create a venturi effect to further accelerate the rise of water. Also, the series of discharge holes 16 in each tube 14 can be horizontally or diametrically opposite to each other at the center line 28 as in FIG. 10*a* or below or above the center line 28 as in FIGS. 10*b* and 10*c*.

Figure 11B:
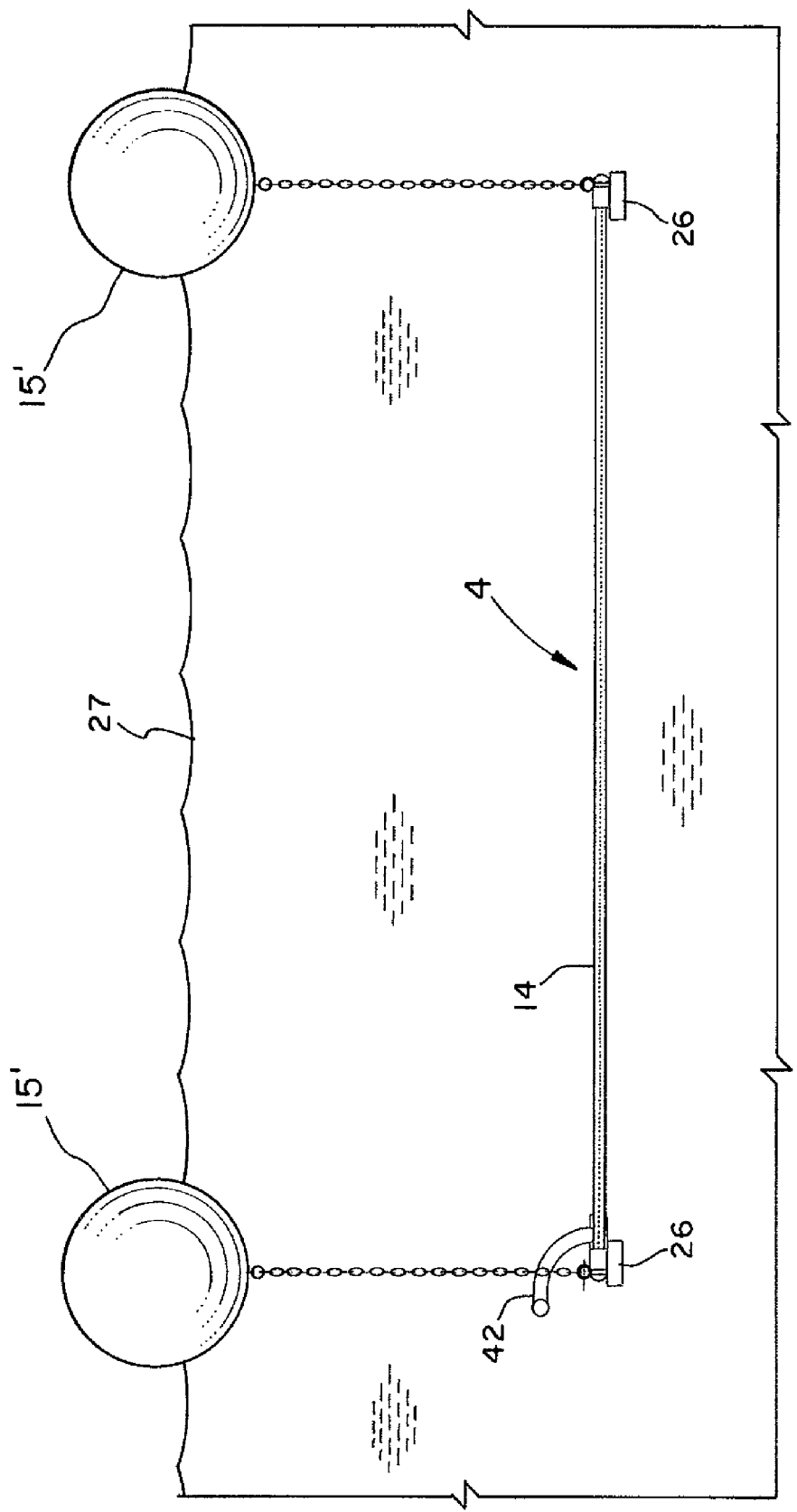

The air manifolds at 4,6 could also be supported separately from and independently of the flotation platform 3 of the earlier embodiments by floats 15' as in FIGS. 11a and 11b with weights provided at 26 (e.g., 5-10 pounds) to keep the air manifolds submerged. The floats 15' as shown are attached adjacent each end of the air manifold 4 of linear tubes 14 and serve to keep the weighted, submerged tubes 14 level in the water. The float supported air manifolds such as 4 in FIGS. 11a and 11b could then be supplied with pressurized air through respective rigid or semi-rigid/flexible lines 42,42' (see FIGS. 11a, 11b, and 12) from a main supply manifold 44 (FIG. 12) rather than the arrangement of 20,20' and 22,22' of FIG. 5. The radially extending air manifolds at 4,6 of the earlier embodiments and their linear tubes 14 could also be concentrically arranged as in FIG. 13 if desired. The air manifolds at 4 in the inner group then extend substantially radially about the central axis 19 at a first distance. The air manifolds at 6 of the outer group in turn extend substantially radially about the central axis 19 at a second distance greater than the first distance of the inner group.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. A water circulation system for drawing water from the depths of a body of water to the surface for exposure to the atmosphere above the surface and creating a circulation pattern in the body of water wherein said system includes a flotation platform extending about a substantially vertical axis, a dish supported adjacent the surface of the body of water, a draft tube depending downwardly from the flotation platform below the dish from an upper portion extending substantially along and about said vertical axis to a lower portion of the draft tube, said lower portion having an inlet to the draft tube and said upper portion having an outlet, and an impeller to draw water from the depths of the body of water into the inlet of the lower portion of the draft tube, up through the draft tube, and out the outlet of the upper portion of the draft tube to the dish with the water from the dish discharging and moving outwardly therefrom substantially about and radially from the vertical axis in an upper flow adjacent the surface of the body of water, and an air stripping arrangement to treat at least a portion of the water in said upper flow discharging outwardly from said dish and to treat at least a portion of the water at a submerged location substantially immediately below said portion of said upper flow, said submerged location extending outwardly substantially adjacent and at least partially about the upper portion of the draft tube, said air stripping arrangement including a plurality of submerged air manifolds extending outwardly of said vertical axis and outwardly from adjacent the upper portion of the draft tube substantially into said submerged location, each air manifold having at least one series of small, discharge holes and being in fluid communication with a source providing pressurized air to each air manifold to drive air from the air manifold out the series of discharge holes to create air bubbles in the water in said submerged location immediately below the portion of upper flow discharging from said dish wherein said air bubbles contact the water in said submerged location and rise to contact the water in said upper flow discharging outwardly from the dish.

2. The system of claim 1 wherein said air manifolds extend substantially radially outwardly of said vertical axis.

3. The system of claim 2 wherein said air manifolds are spaced radially from each other about said vertical axis.

4. The system of claim 3 wherein said air manifolds are substantially linear tubes extending substantially radially outwardly of said vertical axis.

5. The system of claim 1 wherein said air manifolds are arranged into at least two, adjacent sets of at least two air manifolds with the air manifolds in each set spaced immediately adjacent one another and extending substantially radially outwardly of said vertical axis.

6. The system of claim 5 wherein said at least two sets of air manifolds are spaced farther from each other about said vertical axis than the two air manifolds in the respective two sets.

7. The system of claim 6 wherein the at least one series of discharge holes in each of the two air manifolds in at least one of said two sets substantially face one another.

8. The system of claim 7 wherein said one set has at least three air manifolds with at least a first of said three air manifolds having a second series of discharge holes wherein the series of discharge holes in adjacent air manifolds in said one set respectively face one another.

9. The system of claim 8 wherein at least a second of said three air manifolds in said one set has a second series of discharge holes and the second series in said at least first and second air manifolds face outwardly of the one set.

10. The system of claim 5 wherein the at least two, adjacent sets of air manifolds are spaced at least 30 degrees from each other about the vertical axis.

11. The system of claim 10 wherein the at least two, adjacent sets of air manifolds are spaced at least about 60 degrees from each other about the vertical axis.

12. The system of claim 10 wherein the air manifolds in each of the at least two sets are substantially linear tubes extending substantially radially outwardly of said vertical axis.

13. The system of claim 12 wherein the at least two air manifolds in each of said at least two sets are spaced about 1-2 degrees from each other about the vertical axis.

14. The system of claim 5 wherein said system includes more than two sets of air manifolds respectively adjacent one another about the vertical axis and a plurality of said adjacent sets are respectively spaced at least 30 degrees from each other about the vertical axis.

15. The system of claim 5 wherein said system includes more than two sets of air manifolds respectively adjacent one another about the vertical axis and a plurality of said adjacent sets are respectively spaced at least about 60 degrees from each other about the vertical axis.

16. The system of claim 1 wherein said air manifolds extend outwardly of said vertical axis in at least inner and outer groups spaced from each other, the air manifolds of the inner group extending outwardly a first distance relative to said vertical axis and the air manifolds of the outer group extending from adjacent said first distance to a second distance farther from the vertical axis.

17. The system of claim 16 wherein a plurality of the air manifolds in each group extend substantially radially outwardly of the vertical axis.

18. The system of claim 17 wherein a plurality of the radially outwardly extending air manifolds of the inner group are respectively spaced about the vertical axis from a plurality of the radially outwardly extending air manifolds of the outer group.

19. The system of claim 18 wherein said spacing is at least about 30 degrees.

20. The system of claim 18 wherein the air manifolds in the inner group are arranged in at least two, adjacent sets of at least two air manifolds with adjacent sets spaced at least 30 degrees from each other about the vertical axis.

21. The system of claim 20 wherein said adjacent sets of the inner group are spaced at least about 60 degrees from each other about the vertical axis.

22. The system of claim 20 wherein a plurality of the air manifolds in the outer group are arranged in at least two, adjacent sets of at least two air manifolds with adjacent sets spaced at least 30 degrees from each other about the vertical axis.

23. The system of claim 22 wherein said adjacent sets of the outer group are spaced at least about 60 degrees from each other about the vertical axis.

24. The system of claim 23 wherein the adjacent sets of the air manifolds in the inner group are spaced at least about 60 degrees from each other about the vertical axis and at least one set in the adjacent sets of the inner group is spaced about the vertical axis at least 30 degrees from each set in the adjacent sets of the outer group.

25. The system of claim 1 wherein at least some of said air manifolds are substantially tubular with cross-sectional shapes of at least one of circular, elliptical, and diamond shapes.

26. The system of claim 25 wherein at least some of said air manifolds have at least two series of holes with said two series being at least one of substantially horizontally opposite to each other along a center line, spaced above said center line, and spaced below said center line.

27. The system of claim 26 wherein at least some of said air manifolds have substantially inverted U-shaped cross-sections with the opening in the U-shape facing downwardly.

28. The system of claim 1 wherein said air manifolds are supported substantially independently of the flotation platform by separate floats attached to said air manifolds.

29. The system of claim 28 wherein said air manifolds are substantially linear tubes with said air manifolds having first and second ends spaced from each other and said system includes at least one float attached substantially adjacent the respective first and second ends to support the linear tubes of the respective air manifolds in substantially level positions below the surface of the body of water.

30. The system of claim 1 wherein said air manifolds extend substantially radially about the vertical axis at a first distance.

31. The system of claim 30 wherein said air manifolds are arranged in inner and outer, substantially concentric groups with the inner group at said first distance from the vertical axis and the outer group at a second distance from the vertical axis greater than said first distance.

* * * * *